United States Patent [19]

ver der Lely

[11] 4,423,786

[45] Jan. 3, 1984

[54] SOIL CULTIVATING MACHINES

[76] Inventor: Cornelis ver der Lely, 7 Brüschenrain, Zug, Switzerland

[21] Appl. No.: 207,878

[22] Filed: Nov. 18, 1980

Related U.S. Application Data

[63] Continuation of Ser. No. 954,783, Oct. 26, 1978, abandoned.

[30] Foreign Application Priority Data

Nov. 1, 1977 [NL] Netherlands .......................... 7711983

[51] Int. Cl.³ ............................................. A01B 33/06
[52] U.S. Cl. .................................... 172/49.5; 172/117
[58] Field of Search ................ 172/49.5, 59, 719, 713, 172/111, 762, 763

[56] References Cited

U.S. PATENT DOCUMENTS

| | | | |
|---|---|---|---|
| 2,088,141 | 7/1937 | Royston | 172/49.5 |
| 2,741,173 | 4/1956 | White | 172/59 |
| 3,616,862 | 11/1971 | Lely | 172/49.5 |
| 3,667,551 | 6/1972 | Lely | 172/59 |
| 4,002,209 | 1/1977 | Lely | 172/49.5 |
| 4,043,401 | 8/1977 | Lely | 172/59 |
| 4,124,078 | 11/1978 | Lely et al. | 172/49.5 |

Primary Examiner—Richard J. Johnson
Attorney, Agent, or Firm—Penrose Lucas Albright

[57] ABSTRACT

A soil cultivating machine attachment has a row of single tined rotary members. Each rotary member includes a shaft journalled in a hollow box-like frame portion and a lower tine has a holder bolted to the lower end of the shaft. The tine has an operative portion that is curved from its holder so that the majority of that portion co-extends with the center line of the shaft. Each cultivating member can have a single tine that is fastened to the lower shaft end and a supporting part on that end has a face that cooperates with an opposing face of a fastening tine part and a centering member ensures proper fit. The members are removable as separate units together with their bearings, housings, gears and connections, from the top of the hollow frame portion or at least from above the bottom of the frame portion. The shafts are angled forwardly and the members with hollow frame portion, are pivoted to the remainder of the frame through linkages to displace vertically against spring bias while overlapping paths are worked. A scraping member on a parallelogram linkage is mounted on the frame in advance of the members and a screen or screens on the bottom of the frame portion protect the tine-shaft connections. A roller is mounted to the rear of the cultivating members on arms that can adjust the roller relative to the members both vertically and horizontally. The row of members and hollow frame portion can be angled at different positions through the linkages.

10 Claims, 15 Drawing Figures

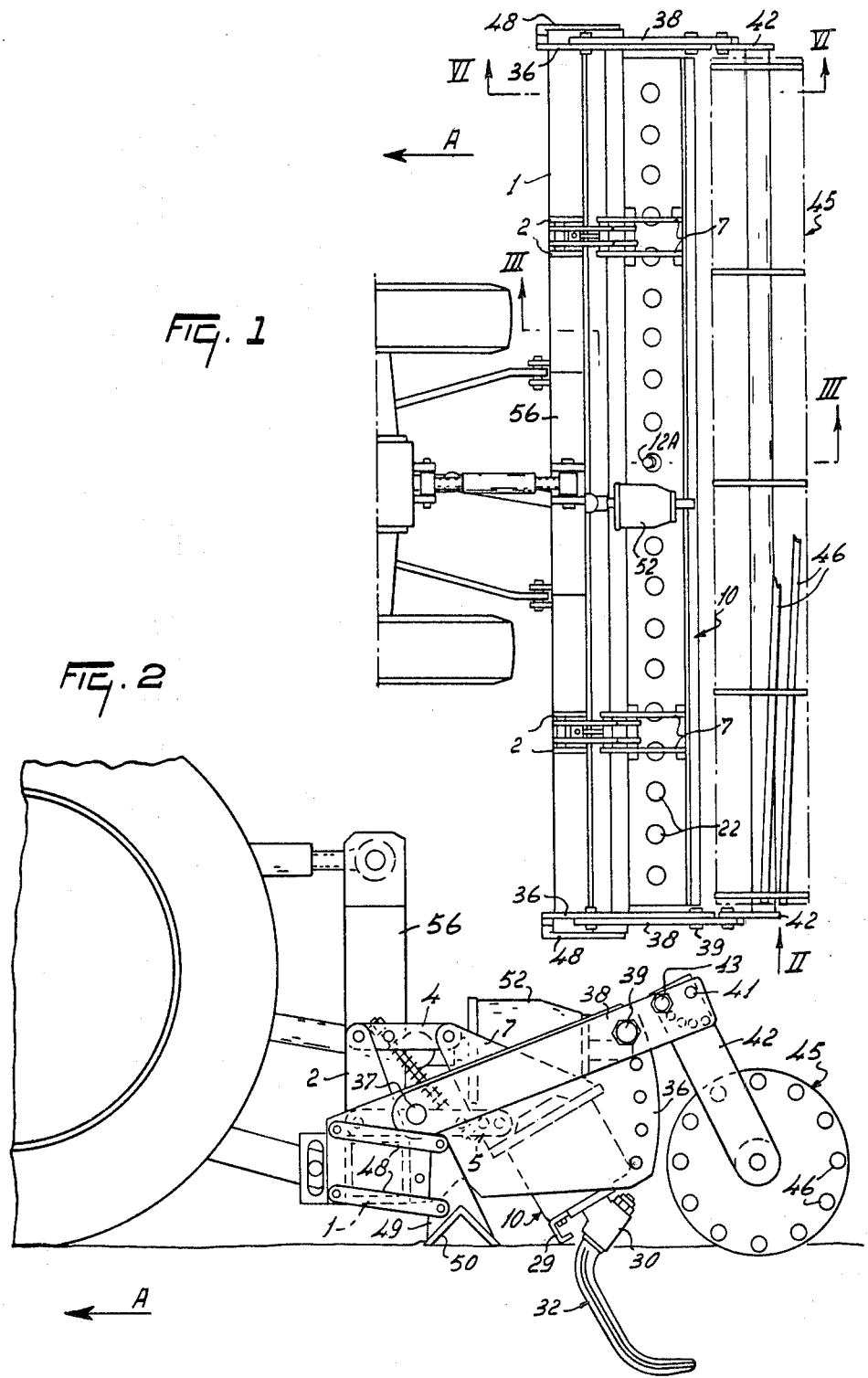

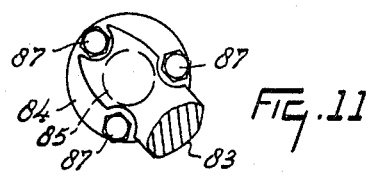
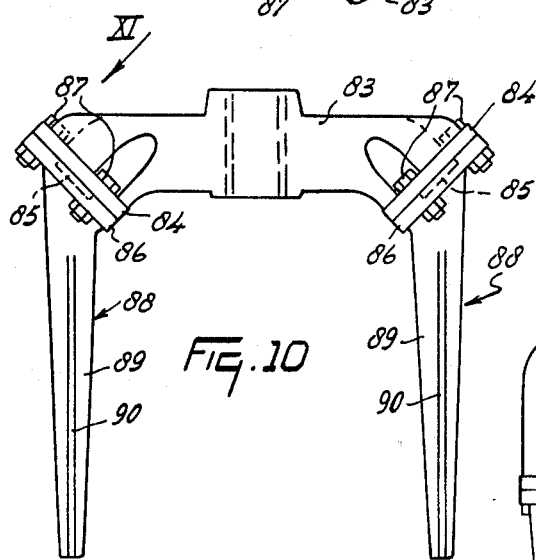
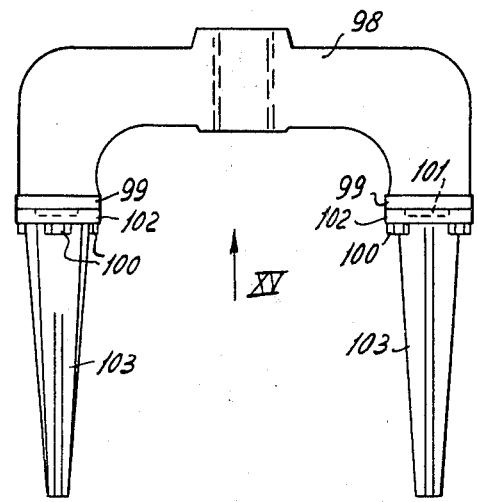
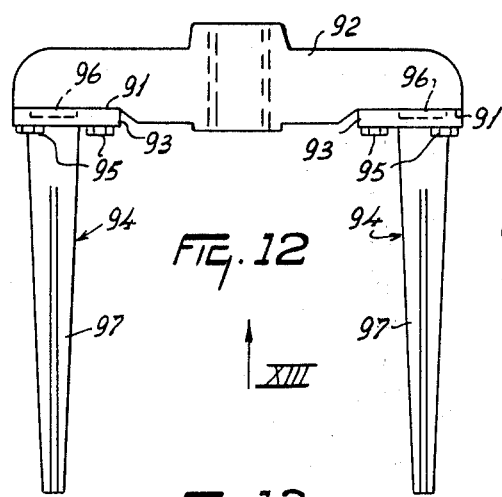
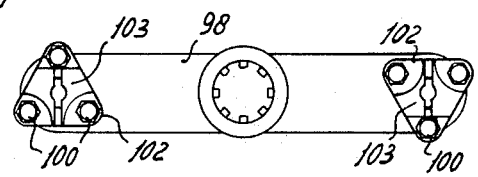
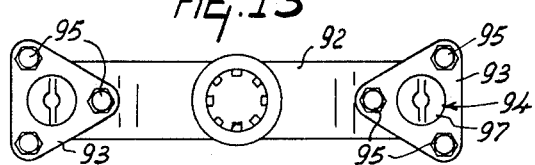

SOIL CULTIVATING MACHINES

This application is a continuation of Ser. No. 954,783 filed Oct. 26, 1978, now abandoned.

SUMMARY OF THE INVENTION

According to the present invention there is provided a soil cultivating machine comprising a box-shaped frame member in which a plurality of cultivating members are journalled so as to be rotatable about upwardly extending rotary shafts each provided with a gear wheel for driving the associated cultivating member, this shaft together with bearings therefor and said gear wheel being mounted as a prefabricated unit in the box shaped frame member.

For a better understanding of the invention and to show how the same may be carried into effect, reference will now be made, by way of example, to the accompanying drawings, in which:

BRIEF DESCRIPTION OF THE DRAWINGS

FIG. 1 is a schematic plan view of a soil cultivating machine, shown hitched to a tractor, FIG. 2 is a side view taken in the direction of arrow II in FIG. 1 and on a larger scale, FIG. 9 is a sectional view taken as if on the line VI—VI in FIG. 1 but of the alternative form of machine of FIGS. 7 and 8, FIG. 10 is a detail view of an alternative form of tine mounting, FIG. 11 is a view taken in the direction of arrow XI in FIG. 10, FIG. 12 is a view similar to FIG. 10, of another form of tine mounting, FIG. 13 is a view in the direction of arrow XIII in FIG. 12, FIG. 14 is a view similar to FIG. 10 of yet another form of tine mounting, and FIG. 15 is a view in the direction of arrow XV in FIG. 14.

DESCRIPTION OF THE PREFERRED EMBODIMENTS

Figure 3:
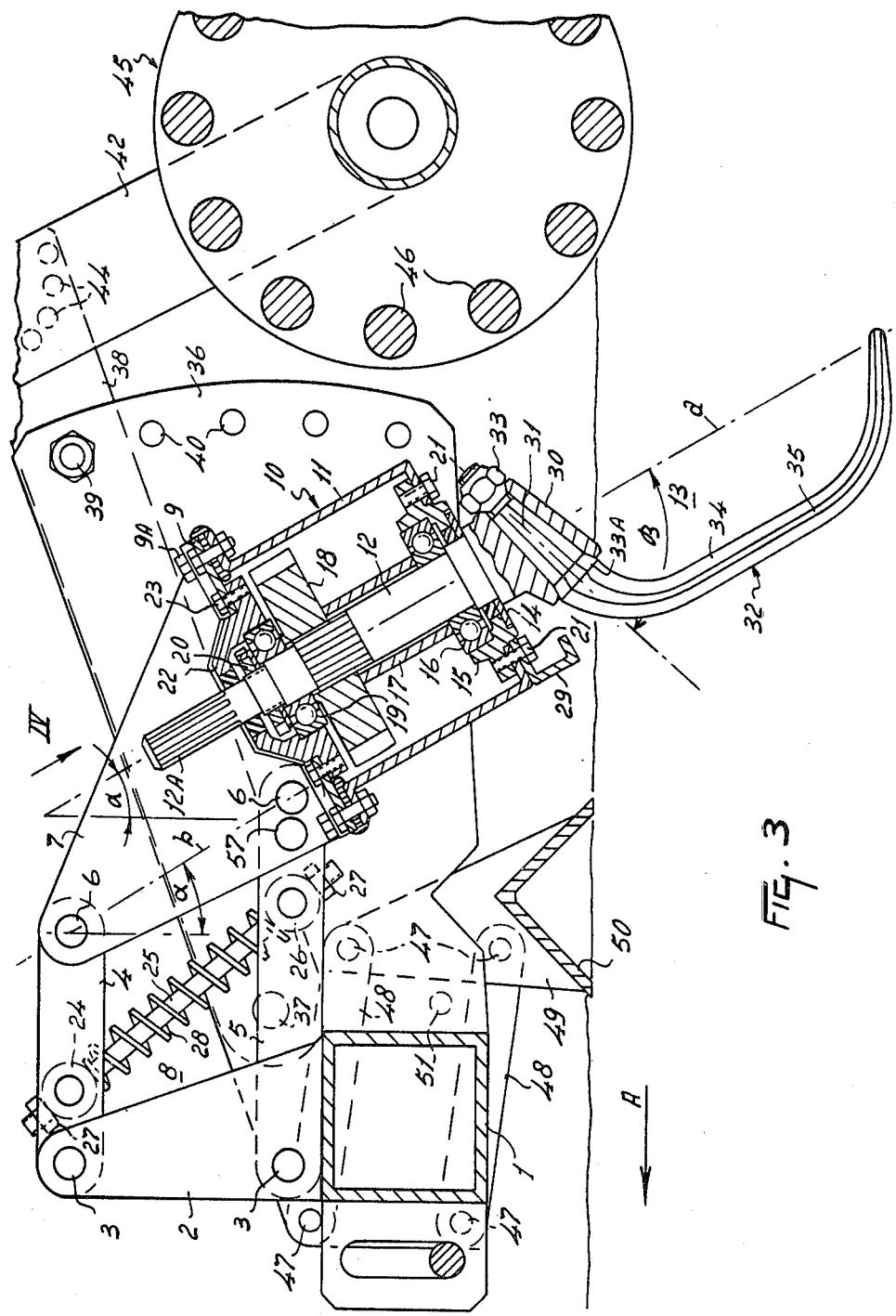
FIG. 3 is a sectional view on a still larger scale taken on the line III—III in FIG. 1.

The device shown in FIGS. 1 to 6 is a soil cultivating machine having a hollow frame beam 1 extending transversely of the intended direction of operative travel A of the machine. The hollow frame beam 1 has an angular, preferably square (as illustrated) cross-section and is disposed so that two walls extend at least substantially in a horizontal direction. On the top wall the frame beam 1 is provided at a distance from its ends with pairs of supports 2, between which pairs of arms 4 and 5 extending to the rear are held by means of pins 3 which extend transversely of the direction of travel A and which are located perpendicularly directly one above the other, as is shown in FIG. 3. The upper arms 4 are shorter than the lower arms 5, the length of an upper arm 4 being about two thirds of the length of a lower arm 5. The rear ends of the respective arms 4 and 5 are pivotally held between pairs of plates 7 by means of pins 6, which also extend transversely of the direction of travel A. The plates 7, like the supports 2, have a triangular shape, viewed from the side, with a tip located at the top. The arms 4 and 5 form part of a pivotable quandrangle 8, in which the distance between the upper pivot points formed by the upper pins 3 and 6 is smaller than the distance between the lower pivot points formed by the lower pins 3 and 6 so that a line b between the longitudinal center lines of the pins 6 is at an angle $\alpha$ of preferably about 30° to the vertical (FIG. 3).

The plates 7 are fastened to a plate 9 which forms the top of a box-shaped frame portion 10. This portion 10 further includes a lower portion 11 closed by means of a plate and bolts 9A. The lower portion 11 of the box-shaped frame portion 10 has a U-shaped cross-section (see FIG. 3) the length of the limbs of which is at least substantially equal to that of the web located between the limbs. From FIG. 3 it will be apparent that with the horizontal position of the arms 4 and 5 shown in the figure the box-shaped frame portion occupies a position in which the limbs of the U-shaped portion are parallel to the line b, owing to the difference in length of the upper and lower arms 4 and 5. The bottom of the U-shaped portion 11 and the cover plate 9 of the box-shaped frame portion 10 have registering openings in which, in a manner to be described more fully hereinafter, upwardly extending shafts 12 of cultivating members 13 are journalled. The openings are disposed so that the distances between the center line a of two neighboring shafts 12 amounts preferably to fifteen centimeters, while the shafts slope to the front parallel to the line b at an angle of about 30° to the vertical.

Near the lower end each shaft 12 is provided with a plate 14 bearing on a shoulder and holding a bearing housing 15. The bearing housing 15 contains a ball bearing 16 surrounding the shaft 12 and supported by a shoulder. A spacer sleeve 17 surrounds the shaft 12 and bears on the ball bearing 16, this sleeve holding a straight toothed gear wheel 18 slipped onto a key-way top end of the shaft 12. The gear wheels 18 on neighboring shafts 12 are drivably in mesh with one another. On the top of the gear wheel 18 is held a ball bearing 19 surrounding the shaft and in order to fix the assembly in place a nut 20 is provided for co-operation with a screwthread on the shaft. The assembly of the shaft 12 with the bearing housing 15, the bearings 16 and 19 and the gear wheel 18 can be prefabricated and can be introduced as a unit from above into the U-shaped portion 11 of the box-shaped frame portion 10, while the bearing housing 15 can be fixed to the bottom of the U-shaped portion with the aid of screw bolts 21. Then a bearing housing 22 can be placed around the upper bearing 19 for closing the opening in the plate 9, this housing 22 being fastened by means of screw bolts 23 to the plate fixed by the bolts 9A.

Near the front, between the upper arms 4, a dock 24 is pivotally arranged to the front of the midpoints of these arms. A rod 25 is passed through this block and also through a pivotable block 26 which is fastened between the lower arms 5 to the rear of the midpoints of these arms. The rod 25 is fixed in place by means of nuts 27 co-operating with screwthreads at the ends of the rod. Between the pivotable blocks 24 and 26 the rod 25 is surrounded by a helical compression spring 28.

At the front the U-shaped portion 11 of the frame portion 10 is provided with a screen 29 covering the entire length of the frame portion and having a U-shaped cross-section. One of the limbs of the screen 29 is fixed in place by means of the screw bolts 21. The other limb extends towards the shaft 12 and at least substantially parallel to the bottom of the U-shaped portion 11, while the web between the limbs is at least substantially in line with the front of the U-shaped portion 11.

Each shaft 12 is provided at the lower end with a carrier having a holder 30. The holder 30 has a recess for receiving a fastening portion 31 of a tine 32. The longitudinal center line of the fastening portion 31 is at an angle $\beta$ of about 70° to the longitudinal center line a of the shaft 12 (FIG. 3). The fastening portion 31 is inclined downwardly in the forwardly direction from its top end. The fastening portion 31, which tapers towards a screwthreaded end receiving a nut 33 and which has a regular hexagonal cross-section, changes through a shoulder 33A also having a hexagonal cross-section into an operative portion 34. At a distance from the shoulder 33A the operative portion 34 is bent over and along the major part of its length it is at least substantially parallel to the rotary axis a of the cultivating member 13. Near its free end the operative portion 34 is bent over, through a distance equal to about one fifth the length of the operative portion, towards the rotary axis a of the cultivating member 13 so that the free end of the tine is intersected by the rotary axis a. The operative portion 34 of the tine 32 tapers from the shoulder 33A towards its free end and on opposite sides the operative portion has a ridge 35 so that a plane passing through the opposite ridges of the portion extending parallel to the rotary axis a is at least substantially tangential to this axis.

The ends of the frame beam 1 are provided with sector-shaped plates 36 extending parallel to the direction of travel A of the machine to beyond the box-shaped frame portion 10 to the rear. The broader part of the sector-shaped plates 36 is located to the rear. At the level of the rear of the frame beam 1, above the frame beam, the plates are provided with stub shafts 37, about which arms 38 are pivotable which extend along the plates to the rear. The arms 38 can be moved into and fixed in any one of a plurality of positions by means of a bolt 39 which can be inserted into a hole in the arms and into any one of a plurality of holes 40 in the rear part of the sector-shaped plates 36. The end of each arm 38 is pivoted by means of a pin 41 to a carrier 42 which can be set in any one of a plurality of positions relative to the arm 38 by means of a bolt 43 (FIG. 2) that is passed through a hole in the carrier 42 and a selected one of a row of holes in the arm 38, which holes are on a pitch circle centered on the pin 41. Between the free ends of the carriers 42 a supporting member formed by a roller 45 is mounted in a freely rotatable manner, this roller being provided at the circumference with helically extending, elongated elements 46. At the front each sector-shaped plate 36 is provided with two stub shafts 47 in overlying positions, about each of which is pivotable a rearwardly extending arm 48. The arms 48 are each pivotally fastened at the rear end, by means of further pins 47, to an upwardly extending support 49 which carries at the lower end a scraping member 50 extending transversely of the direction of travel A and parallel to the frame beam 1. This member 50 is formed by an angle-section iron, the limbs of which are directed downwards. From FIG. 3 it will be seen that each plate 36 has a V-shaped recess adapted to receive the top of the scraping member 50. Near the bottom each of the plates 36 is furthermore provided with a stop 51 for limiting movement of the upper arm 48.

One of the shafts 12 of the cultivating members 13 located near the center has a key-way portion 12A that projects from the frame portion 10. This portion 12A of the shaft 12 can be coupled through an auxiliary shaft directly with the power take-off shaft of a tractor. The speed of the cultivating members 13 when driven in this manner is about 540 rev/min.

Figure 5:
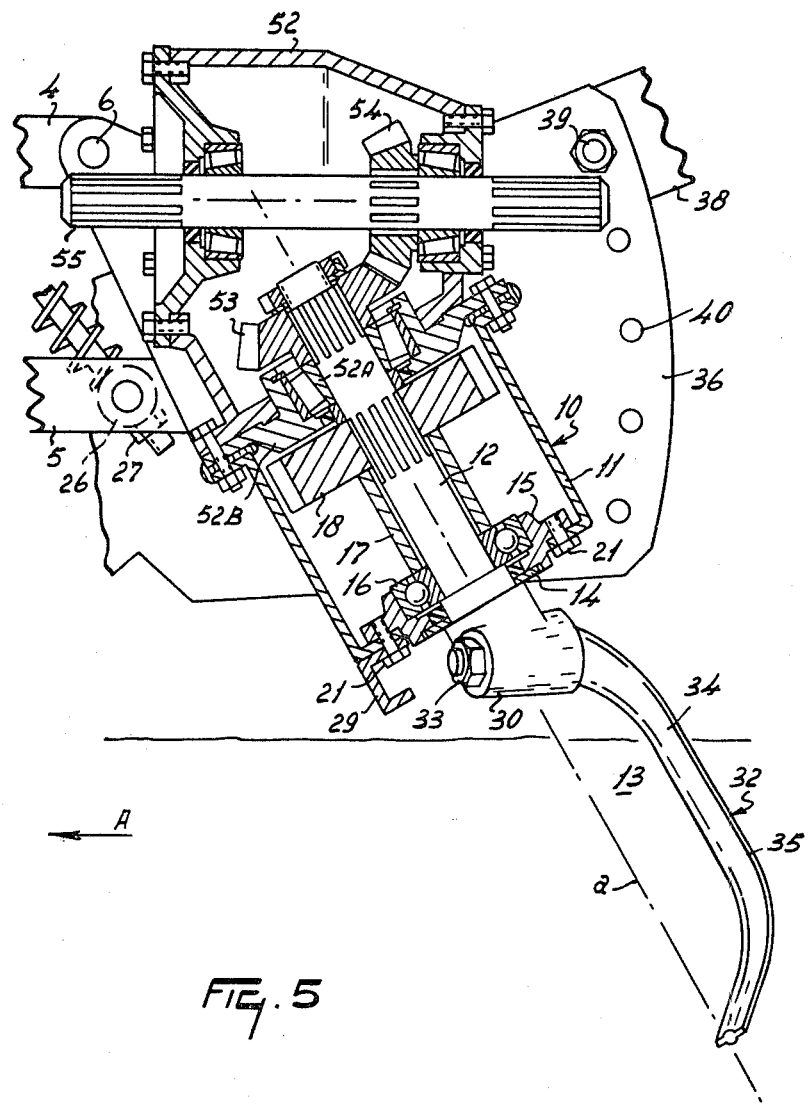
FIG. 5 is a sectional view taken on line V—V in FIG. 4.
Figure 6:
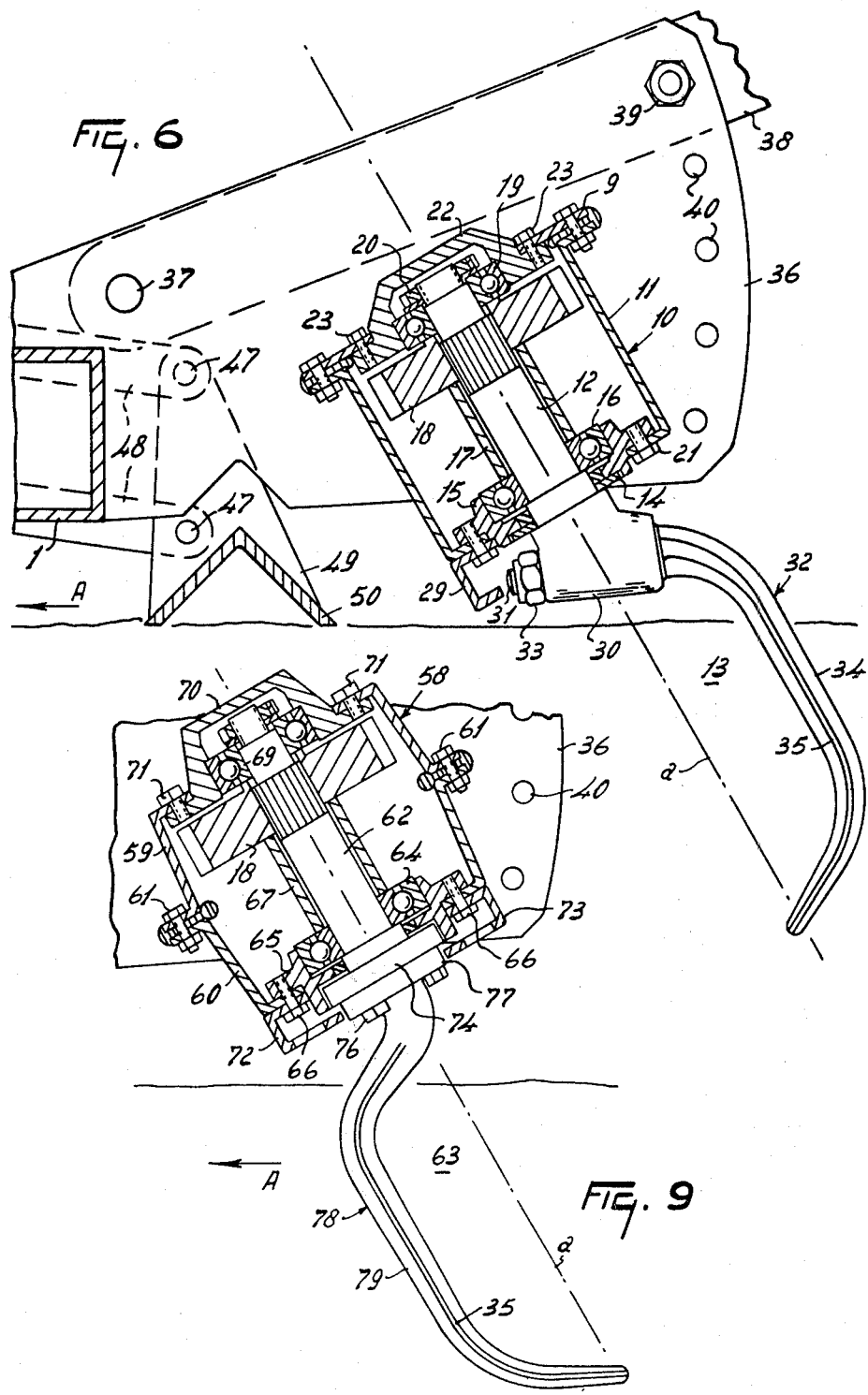
FIG. 6 is a sectional view taken on the line VI—VI in FIG. 1.

The shaft 12 of a cultivating member 13 located at the side of the central cultivating member just discussed extends into a gear box 52 (FIG. 5). At the top this shaft is supported by means of a conical bearing 52A in a bearing housing 52B. Inside the gear box the shaft is provided with a bevel gear wheel 53. The bevel gear wheel 53 is drivably in mesh with a larger bevel gear wheel 54 on a shaft 55 extending in the direction of travel A and held in bearings in the gear box. Key-way ends of this shaft 55 project from the front and rear of the gear box 52 and as an alternative to coupling the central shaft 12 directly to the power take-off shaft of a tractor as just described, the front end of the shaft 55 can be coupled through an auxiliary shaft with the power take-off shaft of the tractor so that in this case drive to the cultivating members is via the transmission in the gear box 52, which is a reducing transmission, so that the respective cultivating members are driven with a speed of about 480 rev/min. The rear end of the shaft 55 may be used for driving any further machines to be combined with the soil cultivating machine, for example, seed drills and fertilizer distributors.

Near the center the frame beam 1 is provided with a trestle 56 for hitching the machine to the three-point lifting device of a tractor.

The machine described above operates as follows. During operation the machine is hitched by means of the trestle 56 to the three-point lifting device of the tractor and the respective cultivating members 13 provided each with only one tine 32 and having their rotary axes a spaced apart preferably by about fifteen centimeters are driven from the power take-off shaft through an auxiliary shaft, either directly or via the reducing transmission gear described above with a speed of either 540 of 480 rev/min as described in the directions indicated by curved arrows in FIG. 4. By their specific operative portions 34 the single tines 32 are capable of bringing about effective crumbling of the soil. During operation the operative portions 34 of the tines 32 of neighboring cultivating members 13 cover overlapping strips of soil of a width of about eighteen centimeters. As stated above, the shafts 12 of the respective cultivating members 13 are, in operation, in a forwardly inclined position (FIG. 2, 3 and 6), the rotary axes a being at angles $\alpha$ of about 30° to the vertical. The bent-over end of each operative portion 34 extends at least substantially in a horizontal direction. With this disposition of the shafts 12 and the tines, material sticking to a tine can be readily conducted away downwards.

Owing to the screen 29 at the front of the hollow frame portion 10 stones or hard objects are prevented from damaging the fastening area of the tines, while in addition crop and root tailings mainly located on the ground surface are prevented from winding around the tines. Owing to the scraping member 50 at the front, which is movable in a direction of height by means of a pivotable polygon in the form of a parallelogram located in front of the scraping member, the soil is already levelled out before it is acted upon by the tines of the respective cultivating members. During operation the box-shaped frame portion 10 can deflect upwardly against spring force with the aid of the pivotable polygon formed by the arms 4 and 5, the assembly then following a path such that the tines of the cultivating members rapidly withdraw from the ground and thus skip an obstacle likely to cause damage. The position of the shafts 12 of the cultivating members 13 may be varied by displacing the lower pivot point between the plates 7 on the frame portion 10 and the lower arm 5. This is allowed by a hole 57 (FIG. 3) in the arm 5, into which the pivot pin 6 can be inserted. In this case the angle $\alpha$ of the shafts amounts to about 23°. By turning the carrier 42 the roller 45 located behind the cultivating members 13 can be displaced to a larger distance from the cultivating members so that adequate space can be provided for arranging delivery members, for example, for seeds or fertilizer.

Since only one tine 32 is used for each cultivating member 13, the machine may be cheaper per running meter, as compared with multi-tined cultivating members, while the cultivating members can be driven with high speed so that lighter shafts may be employed. Since the shafts are spaced apart by a distance of about fifteen centimeters, the tines 32 can move at a comparatively small distance from the rotary axis a of the cultivating members 13 across the soil, so that they are subjected to wear to a lesser extent, which in conjunction with a thicker tine gives a longer liftime.

Figure 4:
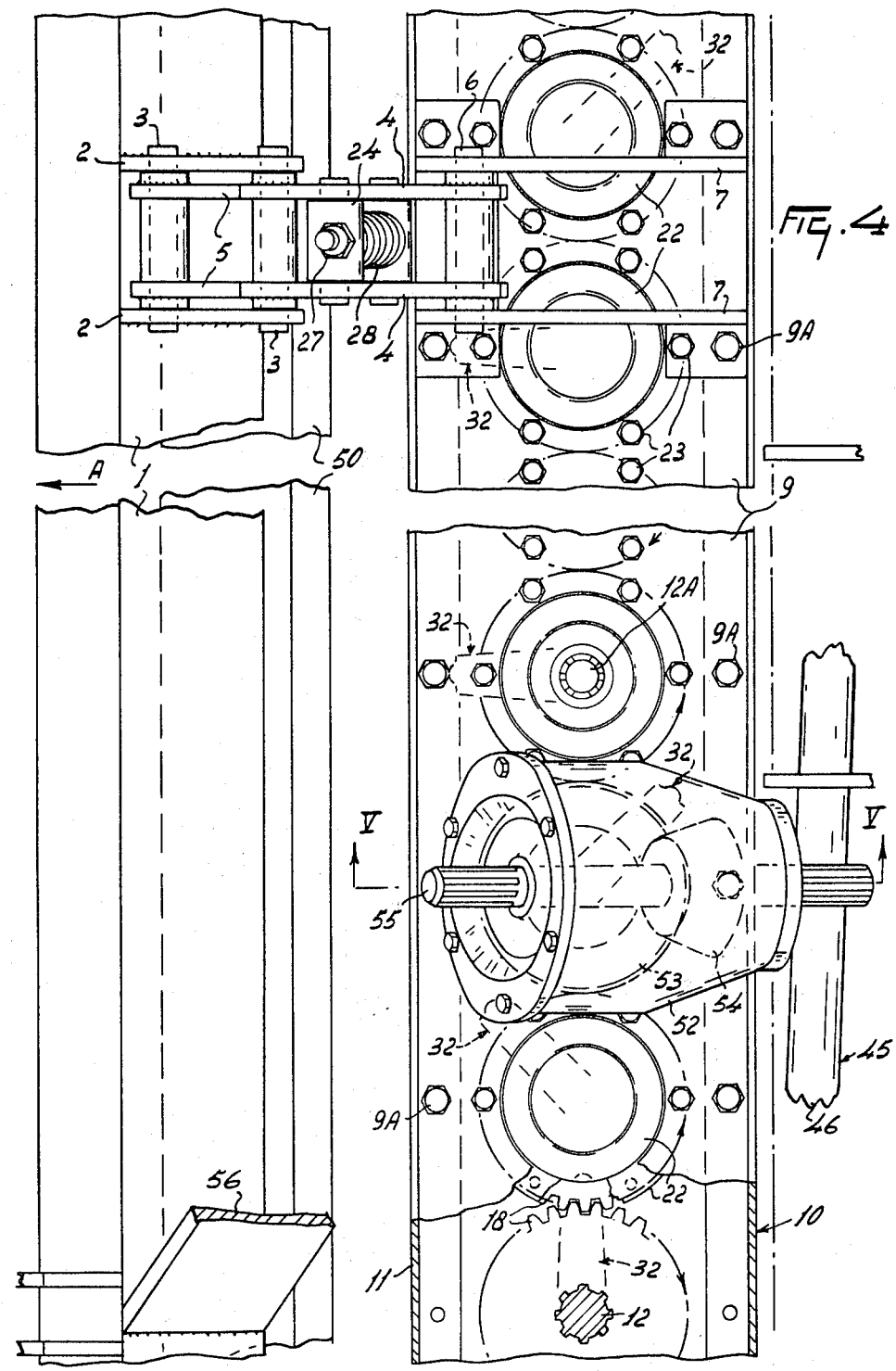
FIG. 4 is a view of a detail taken in the direction of arrow IV in FIG. 3.

From FIG. 4 it will be apparent that the tines 32 of immediately neighboring cultivating member 13 rotating in the same sense are disposed with a relative phase difference which amounts to about 45°, viewed from a tine of a cultivating member extending parallel to the direction of travel A, and in plan, (FIG. 4). Owing the this phase difference the machine runs quietly during operation.

As the gear wheel 18 is located above the bearings 16, damage of the gear wheels 18 is avoided in the event of a defect of the bearing since any fragments will arrive at the bottom of the frame portion 10. By means of the bent-over parts of the operative portions 34, which extend as stated above, at least up to the rotary axis a of the cultivating members 13, roots sticking in the soil can be satisfactorily loosened, while the pivotal polygon formed by the arms 4 and 5 readily allows an upward movement of the cultivating members with the frame portion 10. Moreover, wear of the lower end of the tines is minimized since they are located in close proximity to the rotary axis a of the cultivating members.

If the machine is in a transport position, on excessive downward movement of the scraping member 50 is avoided by means of the stop 51 provided on the plates 36.

Figure 7:
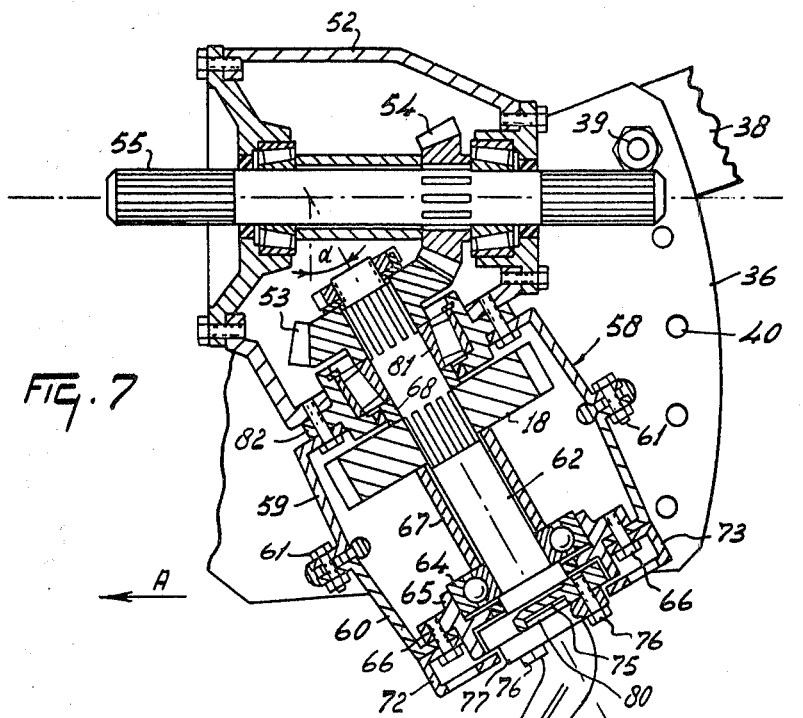
FIG. 7 is a sectional view as if taken on the line V—V in FIG. 4 but of an alternative form of machine.
Figure 8:
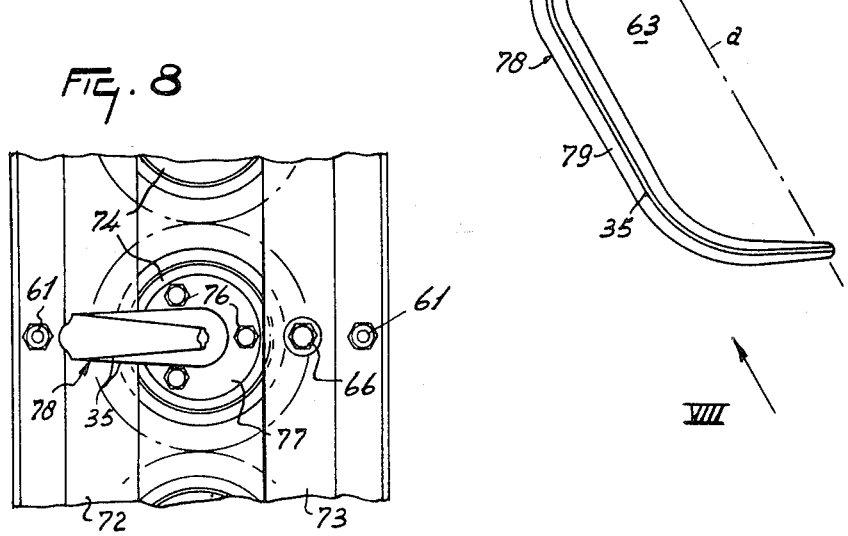
FIG. 8 is a view of a detail taken in the direction of arrow VIII in FIG. 7.

In the form shown in FIGS. 7 to 9 the box-shaped frame portion 58 comprises two portions 59 and 60 which are clamped together at bent-over flanges by bolts 61. Between the bent-over flanges stuffing material is provided. The hollow frame portion 58 is supported in the same manner as the box-shaped frame portion 10 described above. The shafts 62 of the cultivating members 63 are each, in this form, provided with a shoulder with which a ball bearing 64 surrounding the shaft is in engagement, this bearing being accommodated in a housing 65. The housing 65 is fastened from outside in an opening in the bottom portion 60 of the box-shaped frame portion 58 by means of screw bolts 66. The bearing 64 supports a spacer sleeve 67 surrounding the shaft 62 and holding the gear wheel 18. With the exception of one shaft 62 that extends into the gear box 52 (FIG. 7) the shafts 62 have such a ball bearing 69 (FIG. 9) supported by the top of the gear wheel 15. This bearing 69 is in a bearing housing 70 which is fastened in an opening of the upper portion 59 of the box-shaped frame portion 58 with the aid of screw bolts 71.

At the front and at the rear of the lower portion 60 of the box-shaped frame portion 58 a screen 72 and 73 respectively covers the whole length of the frame portion, each screen having a U-shaped cross-section and being secured in a place by one limb with the aid of the bolts 65 by means of which the bearing housing 65 is also secured. The lower coverging limbs of the protective members 72 and 73 extend beyond the downwardly extending walls of the bearing housing 65 and have apertures through which are passed the fastening bolts 66.

The lower end of each shaft 62 forms a carrier with a circular supporting part 74 which has a bottom supporting face having a centering opening 75 (FIG. 7). To the supporting face is secured, by means of three bolts 76, a plate-shaped fastening portion 77 of a tine 78 which has an operative portion 79 extending away from the fastening portion. The fastening portion 77 is provided at the top with a centering member 80 which bears in the centering opening 76. The operative portion 79 of the tine 78 extends from the fastening portion 77 initially in line with the shaft 62 of the associated cultivating member 63 and is then bent over to change into a portion extending at least substantially parallel to the rotary axis a of the associated cultivating member 63. Thereafter the tine is bent over near the lower end towards the rotary axis a so that the free end of the operative portion is located in close proximity to the rotary axis. The structure of the operative portion 70 otherwise corresponds with that of the operative portion 34 of the tine 32 described above.

In the form of FIGS. 7 to 9 the shaft of the cultivating member located near the centre is prolonged into the gear box 52 which corresponds with the gear box 52 already described. Thus this central shaft 62, which is supported in a ball bearing 81 corresponding to the bearing 52A already described, can be coupled with the power take-off shaft of a tractor through a reducing transmission gear like that already described. The bearing 81 is in a housing 82.

It will be appreciated that also in this form a shaft 62 may be provided as in the form first described for being directly coupled with the power take-off shaft of a tractor through an auxiliary shaft.

The operation of the machine of FIGS. 7 to 9 entirely corresponds with that first described. With the construction of FIGS. 7 to 9 winding of material around the tine fastening area and damage of the tine fastening area during operation are avoided by the screens 72 and 73 at the front and at the rear. In this form also, the assembly of the shaft 62 with the bearings 64 and 69 and the gear wheel 18 can be prefabricated and be arranged as a unit in the portion 60 of the box-shaped frame portion 58 which the lower bearing housing 65 can be fastened by means of the screw bolts 66 to the lower portion 60 and subsequently the upper bearing housing 70 can be fastened to the upper portions 59 of the frame portion by means of the screw bolts 71.

FIGS. 10 to 15 show three alternative forms of tine mounting which may be employed in any of the soil cultivating machines described above.

In the form shown in FIGS. 10 and 11 the ends of a carrier 83, which can be fixed to the rotary shaft of a cultivating member, are provided with inclined supporting parts 84 which are flat and have a substantially round circumference. The plane of the supporting face of the supporting part is at an angle of about 45° to the rotary axis of the cultivating member. Each supporting part 84 is provided with a centering member 85. The surface of each supporting part 84 with its centering member 85 can co-operate with a flat tine fastening portion 86 having the same circumferential shape as the supporting part and having a recess for the centering member. The fastening portion 86 is secured by bolts 87 to the supporting part 84. The bolts 87 are located in recesses in the carrier so that the bolts are locked against rotation. The flat fastening portions 86 of the particular tines 88 shown in the Figures are at an angle of about 45° to the longitudinal center line of an operative portion 89 of each tine. The operative portion 89 extends away from the fastening portion 86 at least substantially rectilinearly and tapers towards its free end. Furthermore the operative portion 89 of the tine has a substantially oval cross-section over the major part of its length, the sides farthest from one another being each provided with a rib 90 which extends tangentially to the rotary axis of the cultivating member to which the tine is secured.

In the form shown in FIGS. 12 and 13, supporting parts 91 on a carrier 92 are located on the bottom of the carrier and are at least substantially at right angles to the rotary axis of the cultivating member. The supporting part 91 and the fastening portion 93 of the tine 94 have, in this form, the shape of an at least substantially isosceles triangle, the fastening bolts 95 (which are screw bolts) being located at the corners of this triangle. The tine fastening portion 93 has recess receiving a centering member 96 of the supporting part 91. The operative portion 97 of the tine 91 has a structure substantially similar with that just described. However in this form the tines have a heavier structure.

FIGS. 14 and 15 illustrate a form which a carrier 98 is provided at its ends with downwardly bentover parts, the longitudinal center lines of which are substantially parallel to the rotary axis of the cultivating member. The lower ends of each of these parts are provided with plate shaped supporting parts 99 having, as in the preceding form, a triangular shape and a fastening portion 102 of a tine 103 is secured thereto by means of bolts 100, a centering member 101 again being provided. In this form the tine is shorter than the tines of the two forms described immediately above, but otherwise corresponds therewith.

Although various features of the soil cultivating machines described, and illustrated in the drawings, will be set forth in the following claims as inventive features, the invention is not necessarily limited to these features and may encompasses other inventive features that have disclosed both individually and in various combinations.

What I claim is:

1. A soil cultivating machine comprising a frame having an elongated transverse hollow-box-shaped portion including a U-shaped lower portion and an upper cover portion and a plurality of cultivating members supported on said box-shaped portion, said members being rotatable about upwardly extending axes defined by the longitudinal center lines of upwardly extending shafts, driving means comprising gear wheels on each of said shafts that are in mesh with each other, each said member comprising a unit including the said upwardly extending shaft that is journalled in spaced apart bearings, the said gear wheel on said shaft being disposed between said bearings and respective housings for said bearings, said respective housings being releasably fastened to said box-shaped portion and so arranged and constructed to close openings in the said cover portion and the bottom side of said lower U-shaped portion, said housing formed at least part of the corresponding cover portion and the said bottom side of the said lower U-shaped portion, said unit being insertable and/or removable as a unit from the bottom side of said U-shaped lower portion, said bearing housings of said unit being detachably secured by fastening means to said bottom side of said U-shaped portion and said cover portion respectively, said fastening means providing for releasing said bearing housings from outside of said box-shaped portion.

2. A soil cultivating machine as claimed in claim 1, wherein the diameter of said gear wheel does not exceed the diameter of said upper bearing housing.

3. A soil cultivating machine as claimed in claim 1, wherein the two bearings and said gear wheel are enclosed between a lower stop on said shaft and a nut co-operating with an upper screw threaded part of the shaft.

4. A soil cultivating machine as claimed in claim 1, wherein the bottom and top sides of said U-shaped portion have flanges and said bearing housings are releasably secured to said flanges by the fastening means.

5. A soil cultivating member as claimed in claim 4, wherein the lower end of said shaft is a supporting face for the upper end of a tool, said upper end being a plate-shaped fastening portion that is secured to said face by bolt means, said face having a centering opening that receives a raised centering part of the fastening portion.

6. A soil cultivating member as claimed in claim 5, wherein said tool is a single tine having an elongated operative portion, said operative portion being straight for at least the majority of its length and extending generally parallel to the axis of rotation of said shaft.

7. A soil cultivating machine as claimed in claim 6, wherein each said single tine and neighboring tines are connected to have a relative phase difference, neighboring said tines being driven to work overlapping strips of soil during operation.

8. A soil cultivating member as claimed in claim 4, wherein said flanges at the top of said lower U-shaped portion project outwardly from said opening in said cover portion and the latter is partly closed by a plate, said upper bearing housing being fastened to said plate to completely close said latter opening.

9. A soil cultivating machine as claimed in claim 1, wherein the gear wheel is separated from the lower bearing by a spacer sleeve and the upper bearing engages the top of said gear wheel.

10. A soil cultivating machine as claimed in claim 1, wherein the upwardly extending side limbs of said lower U-shaped portion extend at least substantially parallel to the rotary axes of said shafts.

* * * * *